United States Patent
Hashimoto (10) Patent No.: US 10,405,532 B2
(45) Date of Patent: Sep. 10, 2019

(54) MOBILE RESEARCH SPRAYER

(71) Applicant: Monsanto Technology LLC, St. Louis, MO (US)

(72) Inventor: Harry Hitoshi Hashimoto, St. Louis, MO (US)

(73) Assignee: Monsanto Technology LLC, St. Louis, MO (US)

( * ) Notice: Subject to any disclaimer, the term of this patent is extended or adjusted under 35 U.S.C. 154(b) by 0 days.

(21) Appl. No.: 15/727,934

(22) Filed: Oct. 9, 2017

(65) Prior Publication Data

US 2018/0110212 A1    Apr. 26, 2018

Related U.S. Application Data

(60) Provisional application No. 62/411,217, filed on Oct. 21, 2016.

(51) Int. Cl.
| | |
|---|---|
| *A01M 7/00* | (2006.01) |
| *B05B 1/20* | (2006.01) |
| *B05B 9/04* | (2006.01) |
| *B05B 7/32* | (2006.01) |
| *B05B 13/00* | (2006.01) |

(Continued)

(52) U.S. Cl.
CPC ........ *A01M 7/0042* (2013.01); *A01M 7/0082* (2013.01); *A01M 7/0085* (2013.01); *B05B 1/205* (2013.01); *B05B 7/32* (2013.01); *B05B 9/0403* (2013.01); *B05B 13/005* (2013.01); *B05B 15/555* (2018.02); *B05B 15/70* (2018.02)

(58) Field of Classification Search
CPC ... A01M 7/0042; A01M 7/0085; B05B 1/205; B05B 9/0403; B05B 13/005; B05B 15/70
See application file for complete search history.

(56) References Cited

U.S. PATENT DOCUMENTS

| | | | | |
|---|---|---|---|---|
| 3,699,851 | A | * 10/1972 | Kennedy | ............... B66F 11/046 |
| | | | | 212/349 |
| 5,866,513 | A | 2/1999 | Michelotti et al. | |

(Continued)

FOREIGN PATENT DOCUMENTS

| | | |
|---|---|---|
| WO | 2016025848 A1 | 2/2016 |
| WO | 2016049408 A1 | 3/2016 |
| WO | 2017034799 A1 | 3/2017 |

*Primary Examiner* — Darren W Gorman
(74) *Attorney, Agent, or Firm* — Sandberg Phoenix & von Gontard P.C.

(57) ABSTRACT

A system for spraying objects in a field, wherein the system includes a treatment hoist connectable to a mobile platform main deck. The treatment hoist includes a treatment platform that is structured and operable to support and carry at least one treatment container, and at least one lift assembly. The lift assembly is structured and operable to lower the treatment platform to a loading position and raise the treatment platform to a dispensing position. In the loading position the treatment platform is lowered such that the treatment container(s) can be secured on the treatment platform in order to configure the system to dispense a desired solution, wherein the solution comprises at least one object treatment contained in treatment container(s). In the dispensing position the treatment platform is raised to a height above the objects in order for the system to dispense the solution onto the objects.

21 Claims, 6 Drawing Sheets

(51) Int. Cl.
  *B05B 15/70* (2018.01)
  *B05B 15/555* (2018.01)

(56) References Cited

U.S. PATENT DOCUMENTS

| | | | | |
|---|---|---|---|---|
| 6,966,502 B2 * | 11/2005 | Wilt | ............... | A01M 7/0014 |
| | | | | 239/160 |
| 2010/0169999 A1 | 7/2010 | Cui et al. | | |
| 2014/0277781 A1 * | 9/2014 | Mangen | ............ | A01M 7/0042 |
| | | | | 700/283 |
| 2015/0034736 A1 * | 2/2015 | Jones | ............... | A01M 7/0014 |
| | | | | 239/164 |

* cited by examiner

MOBILE RESEARCH SPRAYER

CROSS-REFERENCE TO RELATED APPLICATIONS

This application claims the benefit of U.S. Provisional Application No. 62/411,217, filed on Oct. 21, 2016. The disclosure of the above application is incorporated herein by reference in its entirety.

FIELD

The present teachings relate to crop spraying systems, and more particularly to crop spraying systems where it is desirable to be able to frequently change the treatment to be sprayed.

BACKGROUND

The statements in this section merely provide background information related to the present disclosure and may not constitute prior art.

To research and develop various strains, hybrids, genotypes of various plants (e.g., cotton, soy, corn, etc.), seed producers, plant, grow, and analyze many different varieties of seed. Typically for such research, a single field is subdivided into multiple research, or test plots, each containing plants with certain germplasm-treatment combinations. Each test plot typically comprises one or more rows of plants comprising from about five to about twenty plants in each row. Mobile sprayers available today are structured and operable to spray a chemical on large crops growing on several acres. However, these systems are not efficient when it comes to spraying different chemicals on several smaller plots in a field (i.e., several research test plots). If a researcher desires to spray two hundred test plots each comprising two rows of twenty plants, and spray those plots with several different chemical formulations, the efficiency of the commercial system is reduced dramatically. For example, if a researcher desires to spray each of several test plots with a different treatment solution, when changing from one chemical to another, the lines carrying the chemical from the chemical containers to the spray head mixing units must be flushed each time the chemical is changed, thereby wasting the flushed chemicals. This is typically done by flushing the lines with a carrier/dilution solution (e.g., water) and dumping the flushed solution on the ground.

Most known mobile sprayers have large holding tanks (e.g., 500 gallon tanks) permanently mounted in the rear of the sprayer. Typically, one tank holds a carrier/dilution solution (e.g., water) and another tank holds one chemical to be sprayed. These tanks feed metering pumps and at least one carrier pump that move the carrier/dilution solution and chemicals from the holding tanks, through approximately 36 feet of tubing/hose, to one or more mixing unit located on or near the spraying boom mounted on the front of the unit. The metering pumps control the amount of chemicals mixed with carrier/dilution solution to produce a treatment solution having the correct mixture to be sprayed on the respective crop. The tubing/hose between the metering pumps and the mixing unit(s) (e.g., approximately 36 feet of tubing/hose) are charged with (i.e., hold) a significant amount of chemical (e.g., 30-40 ounces), and at least that volume of chemical must be flushed (and typically is not recovered) from those lines whenever a plant requires a different chemical treatment. Hence, when spraying a large number of research test plots, with many different chemicals, flushing of the tubing/hose will occur many times. Therefore, when using known spraying systems to treat such a large number of research test plots, the volume and cost of the flushed and wasted solution quickly add up.

SUMMARY

The present disclosure provides a system for spraying objects in a field (e.g., plants, cell, tissue, or organ of a plant, animal, microbe, insect and/or other living thing) in, on, or near a selected location of an agricultural growing area (e.g., a field, greenhouse, shadehouse, etc.). In various embodiments, the system includes a treatment hoist that is connectable at least to a front of a mobile platform main deck. The treatment hoist includes a treatment platform that is structured and operable to support and carry at least one treatment container, and at least one lift assembly. The lift assembly (ies) is/are structured and operable to lower the treatment platform to a loading position and raise the treatment platform to a dispensing position. In the loading position the treatment platform is lowered to a height such that an operator or technician, while standing on the ground, can easily place the treatment container(s) on, and secure them to, the treatment platform in order to configure the system for dispensing a desired solution, wherein the solution comprises at least one object treatment contained in treatment container(s). In the dispensing position the treatment platform is raised above the objects in order to reduce damaging the objects with the frame of the system and mobile platform when it traverses a field and dispense the solution onto the objects.

This summary is provided merely for purposes of summarizing some example embodiments of the present disclosure so as to provide a basic understanding of some aspects of the teachings herein. Other embodiments, aspects, and advantages will become apparent from the following detailed description taken in conjunction with the accompanying drawings which illustrate, by way of example, the principles of the described embodiments. It should be understood that the description and specific examples are intended for purposes of illustration only and are not intended to limit the scope of the present teachings.

DRAWINGS

The drawings described herein are for illustration purposes only and are not intended to limit the scope of the present teachings in any way.

Corresponding reference numerals indicate corresponding parts throughout the several views of drawings.

DETAILED DESCRIPTION

The following description is merely exemplary in nature and is in no way intended to limit the present teachings, application, or uses. Throughout this specification, like reference numerals will be used to refer to like elements. Additionally, the embodiments disclosed below are not intended to be exhaustive or to limit the invention to the precise forms disclosed in the following detailed description. Rather, the embodiments are chosen and described so that others skilled in the art can utilize their teachings. As well, it should be understood that the drawings are intended to illustrate and plainly disclose presently envisioned embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims.

Unless otherwise defined, all technical and scientific terms used herein have the same meaning as commonly understood by one of ordinary skill in the art to which this disclosure belongs. The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps can be employed.

When an element, object, device, apparatus, component, region or section, etc., is referred to as being "on," "engaged to or with," "connected to or with," or "coupled to or with" another element, object, device, apparatus, component, region or section, etc., it can be directly on, engaged, connected or coupled to or with the other element, object, device, apparatus, component, region or section, etc., or intervening elements, objects, devices, apparatuses, components, regions or sections, etc., can be present. In contrast, when an element, object, device, apparatus, component, region or section, etc., is referred to as being "directly on," "directly engaged to," "directly connected to," or "directly coupled to" another element, object, device, apparatus, component, region or section, etc., there may be no intervening elements, objects, devices, apparatuses, components, regions or sections, etc., present. Other words used to describe the relationship between elements, objects, devices, apparatuses, components, regions or sections, etc., should be interpreted in a like fashion (e.g., "between" versus "directly between," "adjacent" versus "directly adjacent," etc.).

As used herein, the term "and/or" includes any and all combinations of one or more of the associated listed items. For example, A and/or B includes A alone, or B alone, or both A and B.

Although the terms first, second, third, etc. can be used herein to describe various elements, objects, devices, apparatuses, components, regions or sections, etc., these elements, objects, devices, apparatuses, components, regions or sections, etc., should not be limited by these terms. These terms may be used only to distinguish one element, object, device, apparatus, component, region or section, etc., from another element, object, device, apparatus, component, region or section, etc., and do not necessarily imply a sequence or order unless clearly indicated by the context.

Moreover, it will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because many varying and different embodiments may be made within the scope of the concept(s) herein taught, and because many modifications may be made in the embodiments described herein, it is to be understood that the details herein are to be interpreted as illustrative and non-limiting.

As used herein, a test plot will be understood to mean a single field, or one of a plurality plots within a research field that has been subdivided into a plurality of plots. Each test plot typically comprises one or more rows of plants comprising from about 5 to about 15 or 20 plants in each row, wherein the plants are subject to various crop breeding and analytics research procedures and tests for developing various strains, hybrids, genotypes, etc. of plants. For example, test plots in a growing area can receive certain treatments (e.g., chemical applications to the plants and/or growing environment), and/or can comprise plants of certain genetics, and/or combinations thereof. Each test plot within a field is purposely separated from other test plots by a gap, or alleys, where no plants are grown. The gaps or alleys maintain the identity of the plant material within each respective test plot. Hence, there are typically many alleys in a research field, often comprising 10-30 feet of space with no plants.

As used herein, a microbe will be understood to be a microorganism, i.e., a microscopic living organism, which can be single celled or multicellular. Microorganisms are very diverse and include all the bacteria, archea, protozoa, fungi, and algae, especially cells of plant pathogens and/or plant symbiotes. Certain animals are also considered microbes, e.g., rotifers. In various embodiments, a microbe can be any of several different microscopic stages of a plant or animal. Microbes also include viruses, viroids, and prions, especially those which are pathogens or symbiotes of crop plants.

As used herein the term plant refers to a whole plant, any part thereof, or a cell or tissue culture derived from a plant, comprising any of: whole plants, plant components or organs (e.g., leaves, stems, roots, etc.), plant tissues, seeds, plant cells, and/or progeny of the same. A plant cell is a biological cell of a plant, taken from a plant or derived through culture from a cell taken from a plant.

As used herein the term fungus refers to a whole fungus, any part thereof, or a cell or tissue culture derived from a fungus, comprising any of whole fungus, fungus components or organs, fungal tissues, spores, fungal cells, including cells of hyphae and/or cells of mycelium, and/or progeny of the same. A fungus cell is a biological cell of a fungus, taken from a fungus or derived through culture from a cell taken from a fungus.

As used herein the phrase population of plants or plant population means a set comprising any number, including one, of individuals, objects, or data from which samples are taken for evaluation, e.g., estimating QTL effects and/or disease tolerance. Most commonly, the terms relate to a breeding population of plants from which members are selected and crossed to produce progeny in a breeding program. A population of plants can include the progeny of a single breeding cross or a plurality of breeding crosses, and can be either actual plants or plant derived material, or in silico representations of the plants. The population members need not be identical to the population members selected for use in subsequent cycles of analyses or those ultimately selected to obtain final progeny plants. Often, a plant population is derived from a single biparental cross, but can also derive from two or more crosses between the same or different parents. Although a population of plants can comprise any number of individuals, those of skill in the art will recognize that plant breeders commonly use population sizes ranging from one or two hundred individuals to several thousand, and that the highest performing 5-20% of a population is what is commonly selected to be used in subsequent crosses in order to improve the performance of subsequent generations of the population.

In various implementations, the devices/apparatuses/systems and methods described herein can be implemented by one or more computer programs executed by one or more processors. In such instances, the computer programs include processor executable instructions that are stored on a non-transitory, tangible, computer-readable medium. The computer programs can also include stored data. Non-limiting examples of the non-transitory, tangible, computer-readable medium are nonvolatile memory, magnetic storage, and optical storage.

Figure 1:
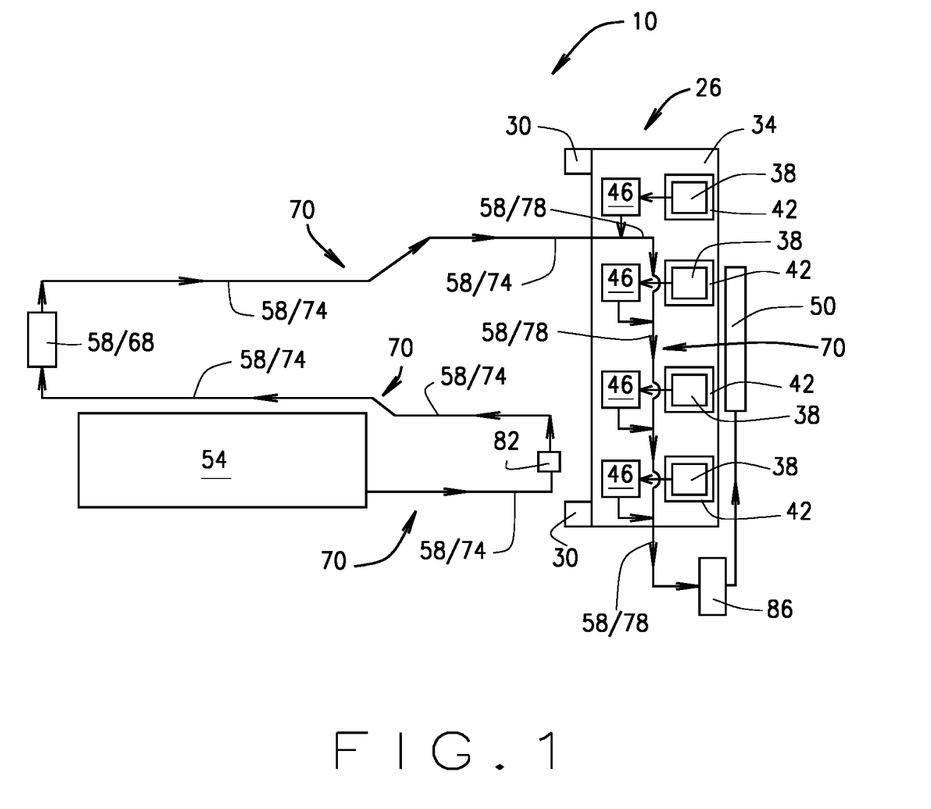
FIG. 1 is a block diagram of a system for spraying objects in a field, in accordance with various embodiments of the present disclosure.
Figure 2:
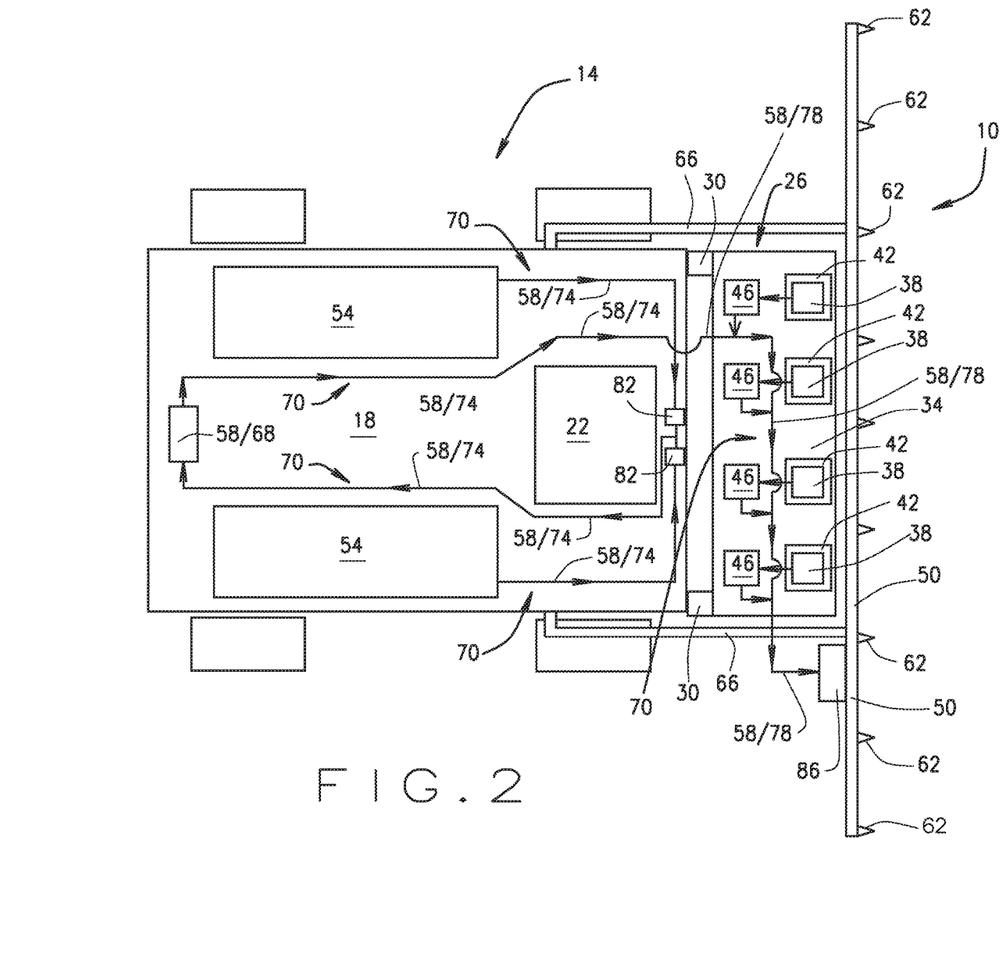
FIG. 2 is a block diagram of a mobile platform including the system for spraying objects shown in FIG. 1, in accordance with various embodiments of the present disclosure.

Referring now to FIGS. 1 and 2, the present disclosure provides a system 10 for spraying objects in a field, wherein the system 10 can be disposed/implemented/installed on a mobile platform 14 (e.g., a terrestrial vehicle, aircraft, etc.). The object(s) can be anything in a field such as any cell, tissue, or organ of a plant, animal, microbe, insect, fungus and/or other living thing growing in, on, or near a selected location in the field (e.g., research plants in a test plot, weeds in a field, soil, roots living the soil, object, microbes living in the soil, etc.). For simplicity, the system 10 will be described herein as being used for spraying plants (e.g., research plants in a test plot, or any cell, tissue, or organ of plants), however, such description is not limiting, and it should be understood that the system 10, as described herein, is equally suitable for use to spray any object(s) growing in, on, or near a selected location in a field (e.g., in a test plot) such as any cell, tissue, or organ of an animal, microbe, insect, fungus and/or other living thing (e.g., the soil, roots living the soil, microbes living in the soil, weeds growing in the field, etc.) and remain within the scope of the present disclosure.

The mobile platform 14 generally includes a main deck 18 and an operator cabin 22, and is self-propelled such that the mobile platform 14 can convey the system 10 across, through and/or over a field of plants (e.g., a test plot of research plants). In various embodiments, the system 10 includes a treatment hoist 26 that can be connected at least to a front portion of the mobile platform main deck 18. The treatment hoist 26 is structured and operable to allow an operator (or other technician) to easily on-load and connect, and disconnect and off-load plant treatment containers to and from the system 10 when the system 10 is installed on the mobile platform 14. In various implementations, the treatment hoist 26 comprising at least one lift assembly 30 and a treatment platform 34 connected or mounted to the lift assembly(ies) 30. The treatment platform 34 is structured and operable to support and carry at least one treatment container 38 that is structured and operable to retain a respective plant treatment (e.g., dry or aqueous plant treatment). In various instances, the plant treatment can comprise a dry or aqueous chemical, or chemical solution. In various instances, the treatment container 38 can be the original container (e.g., jug, jar or bottle) in which the plant treatment is received from the plant treatment manufacture and/or packager, while in other instances the treatment container 38 can be a container structured and operable to receive measured amounts of plant treatment disposed within the respective treatment container 38 by a system operator or technician.

As used herein, and described further below, a "plant treatment", or "plant treatment agent", or "agent" can generally refer to any exogenously-provided compound that can be introduced to the surface of a plant and migrate into a plant tissue.

In various instances, the system 10 can include at least one treatment container retention structure 42 that is secured, mounted or connected to treatment platform 34. Each retention structure 42 is structured and operable to removably receive a respective treatment container 38 and removably secure the respective treatment container 38 to the treatment platform 34. Particularly, in various embodiments, one or more treatment container retention structure 42 can be structured and operable to removably receive and retain the original treatment container 38 (e.g., jug, jar or bottle) in which the respective plant treatment is received from the manufacture and/or packager of the respective plant treatment. Alternatively, in other embodiments, one or more treatment container retention structure 42 can be structured and operable to removably receive and retain a bottom ported container 38 in which a plant treatment can be deposited and, in various instances, mixed therein with a carrier fluid.

Although the system 10 can include one or more lift assembly 30 and remain within the scope of the present disclosure, for simplicity, a single lift assembly 30 will generally be described herein. Each lift assembly 30 is structured and operable to selectively lower the treatment platform 34 to a loading position, and raise the treatment platform 34 to a dispensing position. When the loading position is selected, the lift assembly 30 operates to lower and position the treatment platform 34 near or on the ground such that an operator or technician, while standing on the ground, can easily place the treatment container(s) 38 on, and secured the treatment container(s) 38 to, the treatment platform 34. That is, when the treatment platform 34 is in the loading position, the system 10 can be loaded/configured by an operator or technician, while standing on the ground, with the desired plant treatment to be dispensed, and configured or prepared to dispense or apply (e.g., spray) one or more desired plant treatment on the plants once the treatment platform is raised to the dispensing position.

When the dispensing position is selected, the lift assembly 30 is operated to raise the treatment platform 34, having the desired plant treatment container(s) 38 secured thereon, and position the treatment platform 34 at a system/mobile platform 10/14 operational height, for example, a height that is at least higher than the plants in the field (e.g., substantially equal to the height of the main deck 18 of the mobile platform 14), whereby the mobile platform 14 and system 10 can be operated to traverse the field and dispense or apply (e.g., spray) one or more desired plant treatment solutions on the plants on the plants in the field. As used herein, each plant treatment solution comprises at least a portion of a selected plant treatment contained in at least one treatment container 38. For example, in various instances, a plant treatment can be premixed with a carrier (e.g., water) within the respective container 38 to provide the plant treatment solution. Or, in various other instances, the plant treatment can be extracted from the respective container 38 and subsequently mixed with a carrier (e.g., water) to provide the plant treatment solution, as described below. Or, in various other instances the plant treatment solution can comprise only the plant treatment (e.g., dry or aqueous chemical or chemical solution) within the respective container 38.

In various embodiments, the system 10 additionally includes at least one metering pump 46 that is mounted to the treatment platform 34. Particularly, each metering pump 46 mounted to the treatment platform 34 in close proximity to (e.g., within 2 to 24 inches of) a respective treatment container 38 such that a treatment conveyance hose 48 (shown in FIGS. 3, 4 and 5) that fluidly connects the respective treatment container 38 to the respective metering pump 46 is between approximately 6 inches and 4 feet long (e.g., 1½ feet to 2½ feet). By having a relatively short treatment conveyance hose(s) 48 very little plant treatment remains within the respective hose 48 and is wasted when the respective treatment container 38 is changed, or exchanged, for a different treatment container 38 having a different plant treatment therein.

In various embodiments, the system 10 further includes a sprayer device 50, at least one carrier fluid tank 54 that can be disposed on the main deck 18 of a mobile platform 14, and a carrier/solution delivery system 58. The sprayer device 50 is structured and operable to dispense or apply (e.g., spray) the solution on the plants as the system/mobile platform 10/14 traverses the field. The sprayer device 50 can be any device, apparatus, mechanism, assembly, etc., that is suitable for dispensing or applying (e.g., spraying) the solution on the plants. For example, in various embodiments, the sprayer device 50 can be a sprayer boom (as exemplarily shown in FIG. 2) that includes a plurality of spray nozzles 62 and is operably connected to the mobile platform 14 by a pair of lift arms 66 that are structured and operable to selectively raise and lower the sprayer boom 50. Each carrier fluid tank 54 is structured and operable to hold or retain a carrier fluid (e.g., water). Each carrier fluid tank 54 can be sized and shaped to have any desired volume or capacity. For example, in various embodiments, each carrier fluid tank 54 can be sized and shaped hold 200 to 700 gallons (e.g., 500 gallons) of carrier fluid.

The carrier/solution delivery system 58 fluidly connects the carrier fluid tank(s) 54 and the metering pump(s) 46 to the sprayer device 50. In various embodiments the carrier/solution delivery system 58 comprises at least one carrier pump 68 and a carrier/solution conveyance line 70. The carrier/solution conveyance line 70 comprises a carrier delivery portion 74 and a solution delivery portion 78. The carrier delivery portion 74 comprises one or more pipes, conduits, hoses and/or tubes that fluidly connect the at least one carrier fluid tank 54 with the carrier pump(s) 68 and the carrier pump(s) 68 with the solution delivery portion 78. The solution delivery portion 78 comprises one or more pipes, conduits, hoses and/or tubes that fluidly connect each metering pump 46 with the sprayer device 50. Importantly, at least a section the solution deliver portion (e.g., all or most of the solution deliver portion) is disposed on the treatment platform 34 in close proximity to (e.g., within 2 to 24 inches of) the metering pump(s) 46 and to the sprayer device 50. In various embodiments, the carrier deliver portion can include one or more carrier fluid shut-off valve 82 that is structured and operable to control the flow of the carrier fluid (e.g., turn the flow On or Off) from the respective carrier fluid tank 54. In various embodiments, the solution deliver portion includes a mixer unit 86 disposed between the metering pump(s) 46 and the sprayer device 50. The mixer unit 86 is structured and operable to thoroughly mix the plant treatment/carrier fluid mixture (i.e., the plant treatment solution) prior to dispensing or application (e.g., spraying) of the plant treatment solution on the plants. In various embodiments, the solution deliver portion can include a plurality of mixer units 86, wherein a mixer unit 86 is associated with each metering pump 46 and treatment container 38 paring or tandem.

Figure 3:
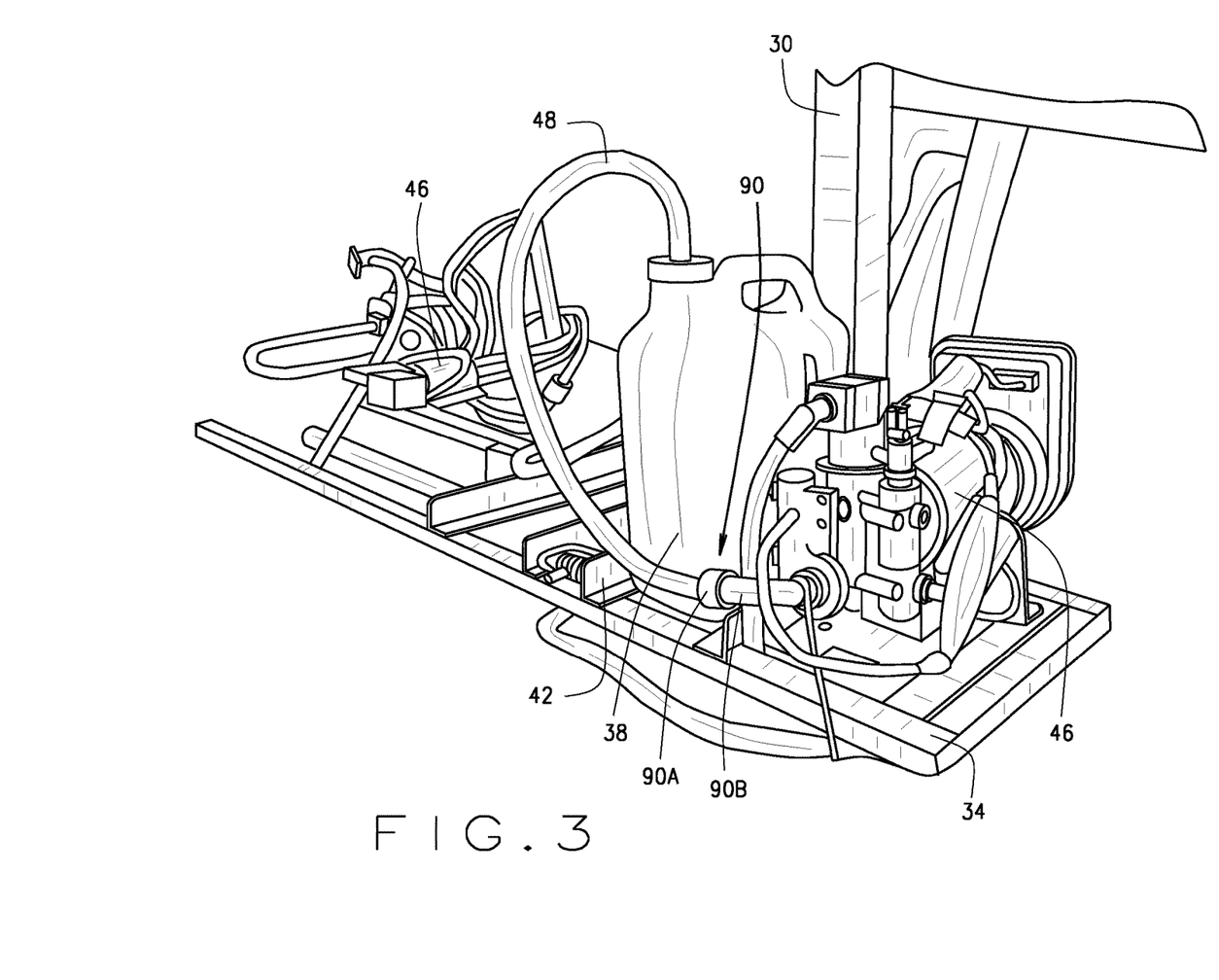
FIG. 3 is an isometric view of a treatment platform of the system shown in FIGS. 1 and 2, in accordance with various embodiments of the present disclosure.
Figure 4:
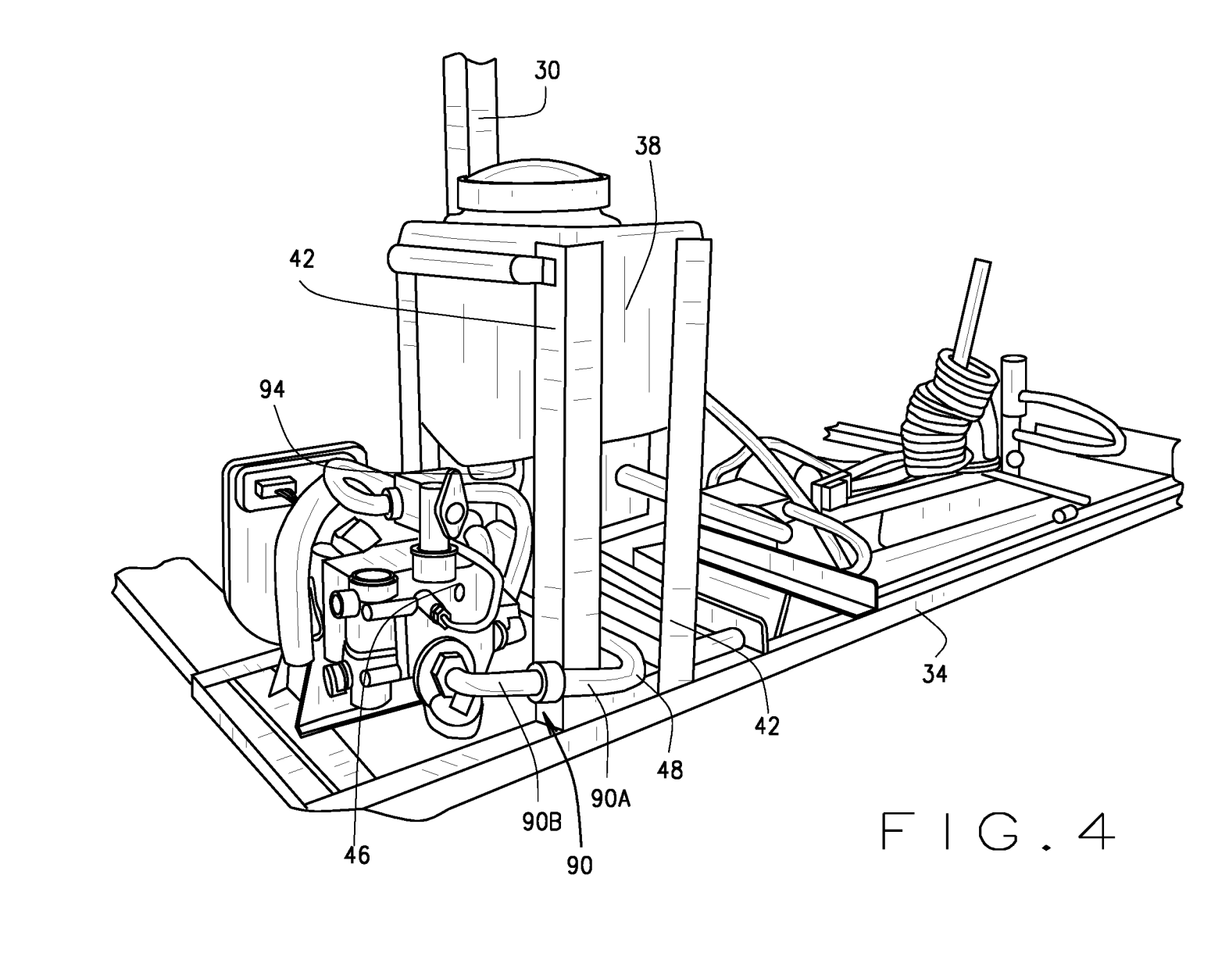
FIG. 4 is another isometric view of a treatment platform and a treatment hoist of the system shown in FIGS. 1 and 2, in accordance with various embodiments of the present disclosure.
Figure 5:
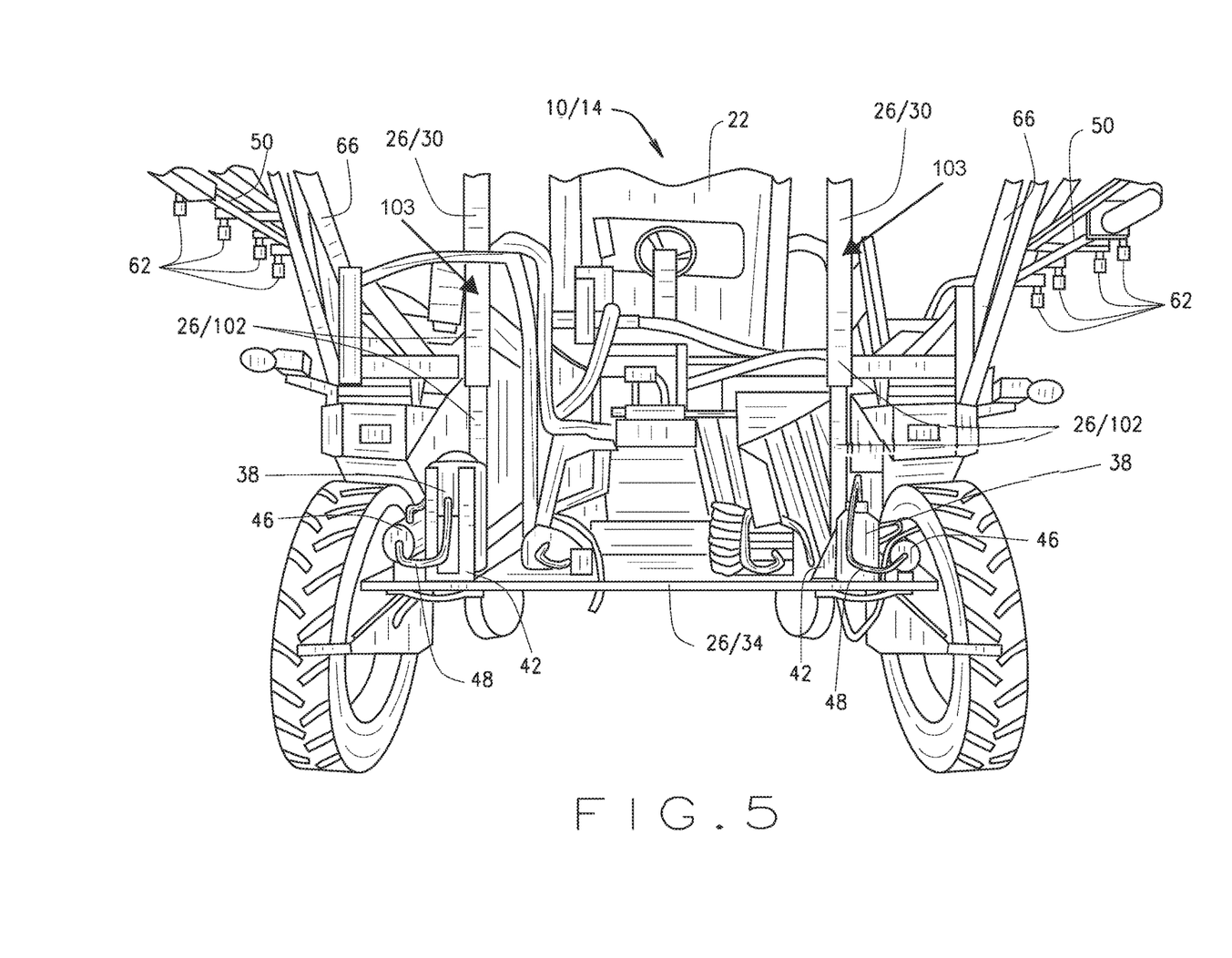
FIG. 5 is a front view of the mobile platform and system shown in FIGS. 1 and 2, illustrating the treatment hoist shown in FIGS. 1 through 4, in accordance with various embodiments of the present disclosure.

Referring now to FIGS. 3, 4 and 5, as described above, by locating the treatment container(s) 38 and the respective metering pump(s) 46 on the treatment platform 34, in close proximity to each other, the treatment conveyance hose(s) 48 can be short, for example, between approximately 6 inches and 4 feet long (e.g., 1½ feet to 2½ feet). Therefore, at any given time, only a minimal amount of the respective plant treatment from the respective treatment container 38, for example, 0.5 to 4.0 ounces (e.g., 2.0 ounces) will be within the respective treatment conveyance hose 48. Therefore, when the respective treatment container 38 is changed, or exchanged, for a different treatment container 38, only a minimal amount of plant treatment will remain within the respective hose 48 and be wasted if the hose 48 needs to be flushed prior to connection to a different treatment container 38 to prevent contamination of the second plant treatment with the first plant treatment.

However, in various embodiments, each treatment container 38 has connected thereto a respective treatment conveyance hose 48 such that treatment container 38 and associated treatment conveyance hose 48 are simultaneously installed and removed from the treatment platform 34 as a single unit. In such embodiments, each treatment conveyance hose 48 and metering pump are fitted with a quick-connect coupling 90, wherein each treatment conveyance hose 48 has a first fitting 90A of the quick-connect coupling 90 attached to a distal end thereof, and each metering pump 46 has a second fitting 90B of the quick-connect coupling 90 attached to an inlet thereof. Therefore, each treatment container 38 and associated treatment conveyance hose 48 can be handled as a single unit, wherein the treatment conveyance hose 48 can be quickly connected to and disconnected from the respective metering pump 46. Moreover, by configuring each treatment container 38 and associated treatment conveyance hose 48 as a single unit, the treatment conveyance hose 48 will not need to be flushed, and the plant treatment remaining therein wasted, each time the respective treatment container 38 is installed and/or removed from the treatment platform 34.

Additionally, as described above, in various embodiments, one or more treatment container 38 can be a bottom ported container 38, such as that exemplarily shown in FIG. 4, wherein the container 38 has port 94 formed in a bottom 98 thereof. In such instances, the respective treatment conveyance hose 48 is connected to the port 94, whereby all, or most all, of the plant treatment within the respective bottom ported container 38 can be evacuated, removed, or drained from the bottom ported container 38 by the respective metering pump 46 for application on the plants. Accordingly, little, if any, plant treatment is wasted.

Referring now to FIG. 5, as described above, each treatment hoist lift assembly 30 is structured and operable to selectively lower the treatment platform 34 to a loading position, and raise the treatment platform 34 to a dispensing position. Each lift assembly 30 can be any assembly, device, apparatus, or mechanism suitable for selectively raising and lowering the treatment platform 34 to the loading and dispensing positions. For example, in various implementations, each lift assembly 30 can comprise an electrical, hydraulic or pneumatic piston type actuator that is structured and operable to retract and extend to raise and lower the treatment platform 34. In various embodiments, as exemplarily illustrated in FIG. 5, each lift assembly 30 can comprise a multi-piece telescoping body 102 to which the treatment platform 34 is mounted at distal end thereof, and a lifting mechanism 103 (e.g., an electrical, hydraulic or pneumatic piston type actuator) disposed within an interior of the multi-piece telescoping body 102 such that the lifting mechanism 103 is not exposed to the ambient environment of the mobile platform 14, and treatment hoist 26 (e.g., overspray of the plant treatment, wind, rain, snow, dirt and other ambient environment debris).

Figure 6:
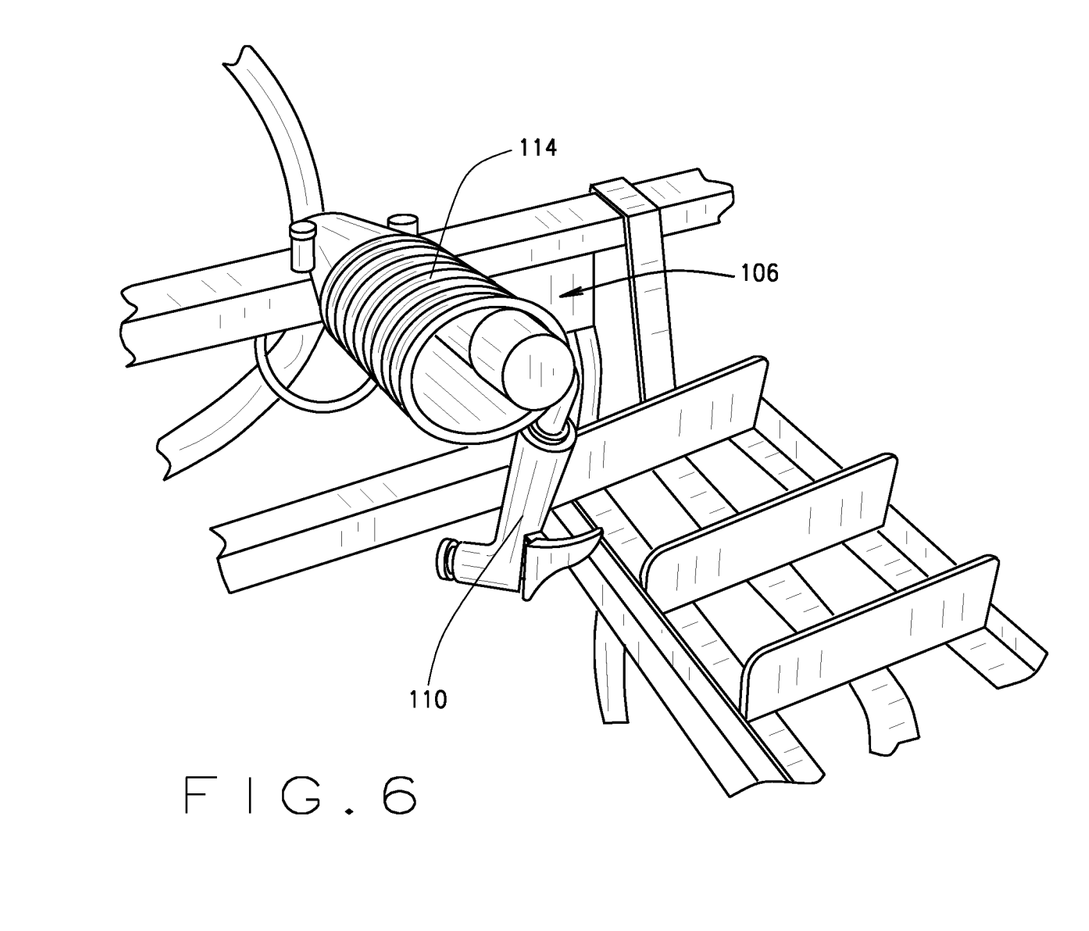
FIG. 6 is an isometric view of a system cleaning sprayer in accordance with various embodiments of the present disclosure.

Referring now to FIG. 6, in various embodiments, the system 10 can include a system cleaning sprayer 106. In various implementations, the system cleaning sprayer comprises a controllable spray handle/nozzle 110 and a hose 114 that connects the spray handle/nozzle 110 to a cleaning liquid source (not shown) mounted on the mobile platform 14. Accordingly, the system cleaning sprayer 106 can be utilized on site (i.e., anywhere in the field or elsewhere) to spray off, rinse and/or clean any part of the mobile platform 14 and/or the system 10. For example, the system cleaning sprayer 106 can be used to spray off, rinse and/or clean the treatment hoist 26 (e.g., the treatment platform 34 and/or lift assembly(ies) 30), and/or the metering pumps 46 before, and/or after a treatment container is disposed on and/or removed from treatment platform 34. In various instances, the cleaning liquid source can be the carrier fluid tank(s) 54, whereby the carried fluid is used to spray off, rinse and/or clean any part of the mobile platform 14 and/or the system 10. Alternatively, in various embodiments, the system 10 can further include a water tank (not shown) mounted anywhere on the mobile platform 14 or system 10, whereby water stored within the water tank can be used to spray off, rinse and/or clean any part of the mobile platform 14 and/or the system 10.

Some of the advantages of the presently disclosed system 10, with regard to known sprayer systems will not be described. In most known sprayer systems the treatment containers holding the plant treatment are placed on the back of deck of the mobile platform. In the system 10, as described above, the treatment containers 38, metering pumps 46, and the solution delivery portion 78 of the carrier/solution conveyance line 70 (e.g., all the pipes, conduits, hoses and/or tubes that fluidly connect each metering pump 46 with the sprayer device 50) are disposed on the treatment platform 34 at the front of the mobile platform 14. By disposing the treatment containers 38, metering pumps 46 and the solution delivery portion 78 of the carrier/solution conveyance line 70 on the treatment platform 34 at the front of the mobile platform 14, less plant treatment is wasted, because the plant treatment does not have to travel from the back of the mobile platform deck 18 to the mixer unit 86 and sprayer device 50, as it must on known sprayer systems. Particularly, known systems require the lines that connect the metering pumps to the mixer unit and sprayer device, wherein these lines run the entire length of mobile platform deck from the back of the deck to the mixer unit at the very front of the mobile platform, to be flushed each time a new plant treatment is to be applied. Hence, large amounts of the plant treatment are wasted each time the plant treatment must be changed. Under plant research and analytics conditions, where test plots are to be treated with many different plant treatments, the lines of known system need to be flushed many times, and the volume of wasted plant treatment quickly adds up.

Additionally, by disposing the treatment containers 38, metering pumps 46, and the solution delivery portion 78 of the carrier/solution conveyance line 70 (e.g., all the pipes, conduits, hoses and/or tubes that fluidly connect each metering pump 46 with the sprayer device 50) on the treatment platform 34 at the front of the mobile platform 14 the mobile platform operator can clearly observe the mixing and transfer of plant treatments while operating the mobile platform 14 and system 10. Furthermore, on current systems changing the plant treatment being applied from one treatment to the next is typically done by hand by carrying the plant treatment up a ladder to the deck of the mobile platform. By implementing the treatment hoist 26 in the system 10 to lower and raise the treatment platform 34 between the loading and dispensing positions, as described herein, the onerous and labor intensive task of climbing a ladder carrying heavy containers of plant treatment is eliminated.

As described above, a used herein, a "plant treatment", or "plant treatment agent", or "agent" can refer to any exogenously-provided compound that can be introduced to the surface of a plant and migrate into a plant tissue. In various embodiments, the plant treatment agent acts extracellularly within the plant tissue, such as interacting with receptors on the outer cell surface. In some embodiments, the plant treatment agent enters into cells within the tissue. In some embodiments, the plant treatment agent is contained within a liquid. Such liquids include, but are not limited to, solutions, suspensions, emulsions, and colloidal dispersions.

In various embodiments, liquids are of an aqueous nature. In various embodiments, aqueous liquids can comprise water soluble components. In various embodiments, aqueous liquids can comprise water insoluble components, can comprise an insoluble component that is made soluble in water by addition of a surfactant, or can comprise any combination of soluble components, insoluble components, and surfactants.

A "plant treatment solution" or "treatment solution" can refer to any solution of liquid that comprises a plant treatment agent. In various embodiments, a plant treatment solution comprises a plant treatment agent and the two terms can often be used synonymously. For example, delivering a plant treatment solution comprising the plant treatment agent colchicine to a plant meristem is essentially synonymous with delivering a plant treatment agent comprising colchicine to a plant meristem.

Plant treatment agents include, but are not limited to, macromolecules including polynucleotides including nucleic acids (e.g. DNA and/or RNA), polypeptides, polysaccharides, polyketides, and the like. Polynucleotides can be single-stranded or double-stranded and can include antisense molecules and interfering RNAs. Polynucleotides can include mutations and/or various other modifications, such as to their backbones, that are well known in the art. Polynucleotides include "genetic elements", which comprise recombinant DNA constructs (commonly referred to as "transgenes") that have been inserted into a plant genome, or a nucleotide sequence, or a genetic locus of a plant genome. Thus, in various embodiments, a user of this invention can deliver a sequence of DNA or RNA to a targeted tissue to alter the expression or inheritance of a plant trait, for example, to effectively "transform" a plant by inserting a genetic element into its genome.

Plant treatment agents can also comprise various phytohormones, phytohormone agonists, phytohormone antagonists, or agents that stimulate or inhibit phytohormone perception, signaling or synthesis. In various embodiments, a plant treatment agent comprises a plant growth regulator (PGR). PGRs are a class of compounds that affect the cellular processes, growth, development or behavior of a plant or plant part. In some embodiments a PGR is responsible for accelerating or retarding the rate of growth or maturation or otherwise altering the behavior of a plant or plant part. In some embodiments, a PGR is a naturally-occurring plant hormone. In some embodiments, a PGR is a chemical that alters flowering, internode length, apical dominance, ripening, root architecture, or fruiting, including any substance that affects growth, development, behavior, or reproduction in a monocot plant. Plant growth regulators include auxins (e.g. IAA) and auxin inhibitors, cytokinins (e.g. BAP) and cytokinin inhibitors, compounds that can stimulate ethylene production (i.e. ACC and the like) and compounds that can inhibit ethylene production (AVG and the like), and compounds that inhibit ethylene perception (silver and the like). Plant growth regulators also comprise compounds that modulate plant perception, signaling, and/or behavior, such as giberrellins and their inhibitors (e.g. Paclobutrazol (PBZ) or uniconazole), abscisic acid and its inhibitors, and jasmonic acid and its inhibitors. Other examples include peptide hormones, for example, systemin, phytosulfokine, rapid alkalinization factor and the like.

In general, plant treatment agents used herein will be water soluble agents. However, the use of plant treatment agents with high, intermediate, low or negligible water solubility can, in various embodiments, be facilitated by the use of liquid compositions that also comprise various transfer or conditioning agents. Transfer or conditioning agents can comprise any agent that facilitates migration of plant treatment agents to the plant (e.g., plant cells) and/or that facilitate uptake of plant treatment agents by the plant. Transfer or conditioning agents include, but are not limited to, (a) surfactants, (b) an organic solvents or an aqueous solutions or aqueous mixtures of organic solvents, (c) oxidizing agents, (d) acids, (e) bases, (f) oils, (g) enzymes, or combinations thereof.

Transfer or conditioning agents thus include, but are not limited to, emulsions, reverse emulsions, liposomes, and other micellar-like compositions. Examples of useful adjuvants include surfactants and effective molecules contained therein, which include sodium or lithium salts of fatty acids (such as tallow or tallowamines or phospholipids). Transfer or conditioning agents can comprise salts including, but not limited to, sodium, ammonium, calcium, lithium, magnesium, chloride, sulfide, and sulfate salts. Various embodiments of the methods provided herein use counter-ions or other molecules that are known to associate with plant treatment agents. For certain negatively charged plant treatment agents such as polynucleotides, cations such as inorganic ammonium ions, alkyl ammonium ions, lithium ions, polyamines such as spermine, spermidine, or putrescine, and the like can be used. Organic solvents useful in conditioning a plant cell to permeation with certain plant treatment agents including, but not limited to polynucleotides, are solvents such as DMSO, DMF, pyridine, N-pyrrolidine, hexamethyiphosphoramide, acetonitrile, dioxane, polypropylene glycol, or other solvents that are miscible with water. Naturally derived or synthetic oils with or without surfactants or emulsifiers can be used, e.g., plant-sourced oils, crop oils (such as those listed in the 9th Compendium of Herbicide Adjuvants, publicly available on the world wide web (internet) at "herbicide.adjuvants.com") can be used. Oils useful in certain liquid compositions used in the methods provided herein include, but are not limited to, paraffinic oils, polyol fatty acid esters, or oils with short-chain molecules modified with amides or polyamines such as polyethyleneimine or N-pyrrolidine.

In various embodiments, a plant treatment agent can be a chromosomal doubling agent. Chromosome doubling agents are used to generate doubled haploid plant cells and doubled haploid plants. Chromosomal doubling agents can comprise various mitotic inhibitors that cause chromosome doubling. In various embodiments, the chromosome doubling agent can be a compound such as colchicine, amiprophos methyl, trifluralin, oryzalin, pronamide, or chloropropham. In still other embodiments, the chromosome doubling agent can be a low mammalian toxicity chromosomal doubling agent. Various low mammalian toxicity chromosome doubling agents that can be used include, but are not limited to, compounds such as: i) 1,2,3-trimethoxy-4-((1S,6R)-6-nitro-cyclohex-3-enyl)-benzene and other related compounds disclosed in U.S. Patent Application Publication 2010/0169999; and ii) compounds disclosed in U.S. Pat. No. 5,866,513 to Michelotti et al. U.S. Patent Application Publication 2010/0169999 and U.S. Pat. No. 5,866,513 are incorporated herein by reference in their entireties. In particular, the 76 compounds disclosed in Table I and 1a on Cols. 3-4, 5-6, and 7-8 of U.S. Pat. No. 5,866,513 are each incorporated herein by reference. In various embodiments, the chromosome doubling agent is a polynucleotide.

In various embodiments, a broad range of chemical concentrations and dosing schedules can be used in conjunction with these methods and one of ordinary skill in the art can optimize the dose administered to a given genotype.

Additionally, in various embodiments, it is envisioned that uses of the spraying system 10 described herein are not limited to certain upstream or downstream activities related to crop analytics test plant treatment application, research, or processing. It is envisioned that one could dispense or apply (e.g., spray) various plant treatments onto plants using at least one structure, feature, and/or function of system 10 described herein to efficiently treat plants, with very little waste of the plant treatments, as part of a commercial plant breeding pipeline that creates many plant varieties. That is, any method of phenotyping, genotyping, or otherwise analyzing the tissues of various plants could be used before, during, or after a various selected plants have had one or more plant treatment applied using the system 10 described herein. For example, a user might treat and analyze a plant sample using the teachings described in PCT Application PCT/US2015/052133, published as WO 2016/049408, titled High Throughput Methods of Analyzing Seed Cotton Using X-Ray Imaging, filed Sep. 25, 2015, and corresponding U.S.

Provisional Application 62/055,861, filed Sep. 26, 2014, the disclosure of each being incorporated by reference herein in their entirety. Similarly, a user might treat and analyze a plant sample using the teachings described in PCT Application PCT/US2016/046280, published as WO 2017/034799, titled Automated Plant Product Sampler, filed Aug. 10, 2016 and corresponding U.S. Provisional Application 62/210,237, filed Aug. 26, 2015, the disclosure of each being incorporated by reference herein in their entirety. A user may treat and analyze the sample(s) using these, and any other methods disclosed in the art, to determine a characteristic of the sample, and then based on that analysis, determine if subsequent plant treatment application is desired.

Furthermore, the methods of using the system 10, as described herein, are not limited to any specific brand, type, or variation of sprayer mobile platform known in the art. Any mobile platform that can that can implement the system 10, as described herein, would fall within the scope of this invention. Furthermore, it is envisioned that, in various embodiments, the system 10 can also include any analytical tool or system useful for determining one or more traits related to crop performance, e.g. yield, fiber quality, etc. Such a system could be a totally automated 'Smart' system, such as the system described in PCT Application PCT/US2015/045301, published as WO 2016/025848, titled Apparatus And Methods For In-Field Data Collection And Sampling, filed Aug. 14, 2015, and corresponding U.S. Provisional Application 62/037,968, filed Aug. 15, 2014, the disclosure of each being incorporated by reference herein in their entirety. Particularly, it is envisioned that the systems and method described in PCT Application PCT/US2015/045301 can incorporate the systems and methods described above, and vice-versa, to collect one or more plant product sample(s), analyze the sample(s), make a decision about a treatment application at the site or on a plant, and apply a treatment—all from the same platform. It is also envisioned that the sample(s) and any information regarding the sample(s), generated by the respective system, could be combined with any data or information collected from an "analytics suite", such as that described in PCT Application PCT/US2015/045301, (e.g., cameras, soil samples, etc., disposed on a mobile platform 14) to assist in this process.

The description herein is merely exemplary in nature and, thus, variations that do not depart from the gist of that which is described are intended to be within the scope of the teachings. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the disclosure. Such variations and alternative combinations of elements and/or functions are not to be regarded as a departure from the spirit and scope of the teachings.

What is claimed is:

1. A system for spraying objects in a field, said system comprising:
   a mobile platform comprising a main deck having a front face;
   a treatment hoist connected to the front face of the mobile platform main deck, the treatment hoist comprising:
      at least one lift assembly connected to the front face of the mobile platform main deck; and
      a treatment platform connected to the at least one lift assembly and extending forward of the front face of the mobile platform main deck, and structured and operable to support and carry at least one treatment container; and
   wherein, the at least one lift assembly is structured and operable to:
      lower the treatment platform forward of the front face of the mobile platform main deck to a ground surface on which the mobile platform is supported such that the treatment platform is in a loading position for securing the at least one treatment container on the treatment platform to configure the system to dispense a solution that includes at least one object treatment contained in the at least one treatment container, and
      raise the treatment platform forward of the front face of the mobile platform main deck to an operational height above the ground such that the treatment platform is in a dispensing position for dispensing the solution onto objects in a field.

2. The system of claim 1, wherein the treatment platform comprises at least one treatment container retention structure mounted to a top surface of the treatment platform, the at least one treatment container retention structure being structured to removably secure a treatment container to the treatment platform.

3. The system of claim 2, wherein the at least one container retention structure is structured to removably secure the treatment container substantially in contact with the top surface of the treatment platform.

4. The system of claim 2, wherein the at least one container retention structure is structured to removably secure the treatment container suspended above the top surface of the treatment platform.

5. The system of claim 1 further comprising at least one metering pump mounted to the treatment platform, each metering pump mounted to the treatment platform in close proximity to a respective treatment container.

6. The system of claim 5, wherein each metering pump includes a quick-connect coupling for connecting and disconnecting a treatment container hose to and from the metering pump, the treatment container hose structured and operable to fluidly connect the treatment container to the metering pump.

7. The system of claim 5, wherein each metering pump is mounted to the treatment platform such that a treatment conveyance hose that is structured and operable to fluidly connect the treatment container to the metering pump is less than 25 feet long.

8. The system of claim 5, wherein each metering pump is mounted to the treatment platform such that a treatment conveyance hose that is structured and operable to fluidly connect the treatment container to the metering pump is less than 20 feet long.

9. The system of claim 5, wherein each metering pump is mounted to the treatment platform such that a treatment conveyance hose that is structured and operable to fluidly connect the treatment container to the metering pump is less than 15 feet long.

10. The system of claim 5, wherein each metering pump is mounted to the treatment platform such that a treatment conveyance hose that is structured and operable to fluidly connect the treatment container to the metering pump is less than 10 feet long.

11. The system of claim 5, wherein each metering pump is mounted to the treatment platform such that a treatment conveyance hose that is structured and operable to fluidly connect the treatment container to the metering pump is less than 5 feet long.

12. The system of claim 5, wherein each metering pump is mounted to the treatment platform such that a treatment conveyance hose that is structured and operable to fluidly connect the treatment container to the metering pump is less than 2 feet long.

13. The system of claim 5 further comprising:
    a sprayer device connected to the mobile platform main deck separate from the treatment platform;
    at least one carrier fluid tank disposed on the mobile platform main deck; and
    a carrier/solution delivery system that fluidly connects the at least one carrier fluid tank and the at least one metering pump to the sprayer device, the carrier/solution delivery system comprising:
        a carrier pump; and
        a carrier/solution conveyance line that comprises a carrier delivery portion and a solution delivery portion, wherein the carrier delivery portion fluidly connects the carrier pump to the solution delivery portion, and the solution delivery portion fluidly connects each metering pump with the sprayer device, wherein at least a section the solution delivery portion is disposed on the treatment platform in close proximity to the at least one metering pump and to the sprayer device.

14. The system of claim 1, wherein each lift assembly comprises:
    a multi-piece telescoping body to which the treatment platform is mounted at distal end thereof; and
    a lifting mechanism disposed within an interior of the multi-piece telescoping body such that the lifting mechanism is not exposed to the ambient environment of the treatment hoist.

15. The system of claim 1, wherein the objects sprayed comprise at least one of:
    a cell of at least one of a plant, animal, microbe and insect;
    tissue cell of at least one of a plant, animal, microbe and insect; and
    an organ of at least one of a plant, animal, microbe and insect.

16. The system of claim 15, wherein the objects sprayed are located above the soil.

17. The system of claim 15, wherein the objects sprayed are located in the soil.

18. A system for spraying objects in a field, said system comprising:
    a mobile platform comprising a main deck having a front face;
    a treatment hoist connected to the front face of the mobile platform main deck, the treatment hoist comprising:
        at least one lift assembly connected to the front face of the mobile platform main deck; and
        a treatment platform connected to the at least one lift assembly and extending forward of the front face of the mobile platform main deck, and structured and operable to support and carry at least one treatment container; and
        wherein, the at least one lift assembly comprises:
            a multi-piece telescoping body to which the treatment platform is mounted at distal end thereof; and
            a lifting mechanism disposed within an interior of the multi-piece telescoping body such that the lifting mechanism is not exposed to the ambient environment of the treatment hoist,
        wherein the lift assembly is structured and operable to:
            lower the treatment platform forward of the forward of the front face of the mobile platform main deck to a ground surface on which the mobile platform is supported such that the treatment platform is in a loading position for securing the at least one treatment container on the treatment platform to configure the system to dispense a solution that includes at least one object treatment contained in the at least one treatment container, and
            raise the treatment platform forward of the front face of the mobile platform main deck to an operational height above the ground such that the treatment platform is in a dispensing position for dispensing the solution onto objects in a field.

19. The system of claim 18 further comprising at least one metering pump mounted to the treatment platform, each metering pump mounted to the treatment platform in close proximity to a respective treatment container.

20. The system of claim 19, wherein each metering pump is mounted to the treatment platform such that a treatment conveyance hose that is structured and operable to fluidly connect the treatment container to the metering pump is less than 25 feet long.

21. A system for spraying objects in a field, said system comprising:
    a mobile platform comprising a main deck having a front face;
    a treatment hoist connected to the front face of the mobile platform main deck, the treatment hoist comprising:
        at least one lift assembly connected to the front face of the mobile platform main deck,
        a treatment platform connected to the at least one lift assembly and extending forward of the front face of the mobile platform main deck, and structured and operable to support and carry at least one treatment container; and
        wherein, the at least one lift assembly comprises:
            a multi-piece telescoping body to which the treatment platform is mounted at distal end thereof; and
            a lifting mechanism disposed within an interior of the multi-piece telescoping body such that the lifting mechanism is not exposed to the ambient environment of the treatment hoist,
        wherein the lift assembly is structured and operable to:
            lower the treatment platform forward of the front face of the mobile platform main deck to a ground surface on which the mobile platform is supported such that the treatment platform is a loading position for securing the at least one treatment container on the treatment platform to configure the system to dispense a solution that includes at least one object treatment contained in the at least one treatment container, and
            raise the treatment platform forward of the front face of the mobile platform main deck to an operational height above the ground such that the treatment platform is in a dispensing position for dispensing the solution onto objects in a field;

at least one metering pump mounted to the treatment platform, each metering pump mounted to the treatment platform such that a treatment conveyance hose that is structured and operable to fluidly connect each treatment container to a respective metering pump is less than 25 feet long;

a sprayer device connectable to the mobile platform main deck separate from the treatment platform;

at least one carrier fluid tank disposable on the mobile platform main deck; and a carrier/solution delivery system that fluidly connects the at least one carrier fluid tank and the at least one metering pump to the sprayer device, the carrier/solution delivery system comprising:

a carrier pump; and a carrier/solution conveyance line that comprises a carrier delivery portion and a solution delivery portion, wherein the carrier delivery portion fluidly connects the carrier pump to the solution delivery portion, and the solution delivery portion fluidly connects each metering pump with the sprayer device, wherein at least a section the solution delivery portion is disposed on the treatment platform in close proximity to the at least one metering pump and to the sprayer device.

* * * * *